United States Patent
Baldwin

(10) Patent No.: US 12,059,693 B2
(45) Date of Patent: Aug. 13, 2024

(54) NOZZLE GEOMETRY TO CREATE ROTATIONAL VORTEX

(71) Applicant: Kidde Technologies, Inc., Wilson, NC (US)

(72) Inventor: Eli Baldwin, Knightdale, NC (US)

(73) Assignee: KIDDE TECHNOLOGIES, INC., Wilson, NC (US)

( * ) Notice: Subject to any disclaimer, the term of this patent is extended or adjusted under 35 U.S.C. 154(b) by 149 days.

(21) Appl. No.: 17/489,657

(22) Filed: Sep. 29, 2021

(65) Prior Publication Data
US 2023/0095826 A1    Mar. 30, 2023

(51) Int. Cl.
| | | |
|---|---|---|
| B05B 1/34 | (2006.01) | |
| A62C 3/08 | (2006.01) | |
| A62C 35/68 | (2006.01) | |

(52) U.S. Cl.
CPC ............. *B05B 1/3405* (2013.01); *A62C 3/08* (2013.01); *A62C 35/68* (2013.01)

(58) Field of Classification Search
CPC .......... B05B 1/3405; A62C 3/08; A62C 35/68
USPC .............................. 169/62; 239/487, 489, 490
See application file for complete search history.

(56) References Cited

U.S. PATENT DOCUMENTS

| | | | | |
|---|---|---|---|---|
| 5,505,262 A | * | 4/1996 | Cobb | E21B 28/00 |
| | | | | 175/323 |
| 7,578,454 B2 | * | 8/2009 | Joo | A62C 31/05 |
| | | | | 239/487 |
| 8,308,082 B2 | | 11/2012 | Ivy | |
| 8,616,471 B2 | | 12/2013 | Short | |
| 8,636,232 B2 | | 1/2014 | Metzger | |
| 10,619,855 B2 | | 4/2020 | Brogan et al. | |
| 2006/0049276 A1 | * | 3/2006 | Ivy | A62C 25/00 |
| | | | | 239/251 |
| 2019/0143160 A1 | | 5/2019 | Johnson et al. | |

FOREIGN PATENT DOCUMENTS

| | | |
|---|---|---|
| EP | 3482800 A1 | 5/2019 |
| WO | 2014030840 A1 | 2/2014 |

OTHER PUBLICATIONS

European Search Report for Application No. 22192333.7, mailed Feb. 7, 2023, 62 pages.

\* cited by examiner

*Primary Examiner* — Christopher S Kim
(74) *Attorney, Agent, or Firm* — CANTOR COLBURN LLP

(57) ABSTRACT

A nozzle of a fire suppression system includes a housing. Two or more orifices in the housing emit a fire suppression agent. Each of the two or more orifices emits the fire suppression agent in a rotational vortex.

7 Claims, 3 Drawing Sheets

NOZZLE GEOMETRY TO CREATE ROTATIONAL VORTEX

BACKGROUND

Exemplary embodiments pertain to the art of fire suppression and, in particular, to nozzle geometry to create a rotational vortex.

Smoke detection and fire suppression are important functions in many environments. In an aircraft, for example, the functions are critical. This is because, unlike in other environments where escape is possible, quick suppression of a fire is vital to the integrity of the aircraft and the safety of the passengers. Once an overheat or fire condition is detected, a fire suppression agent may be discharged.

BRIEF DESCRIPTION

In one embodiment, a nozzle of a fire suppression system includes a housing and two or more orifices in the housing emit a fire suppression agent. Each of the two or more orifices emits the fire suppression agent in a rotational vortex.

Additionally or alternatively, in this or other embodiments, the nozzle also includes a structure suspended within the housing to restrict a path for the fire suppression agent from an inlet of the housing to the two or more orifices. The path is between the structure and an inner surface of the housing.

Additionally or alternatively, in this or other embodiments, the structure restricts the path closer to the two or more orifices more than the path farther from the two or more orifices near the inlet.

Additionally or alternatively, in this or other embodiments, the two or more orifices are an even number of orifices.

Additionally or alternatively, in this or other embodiments, each pair of the two or more orifices emits a counter-rotational flow of the fire suppression agent in the rotational vortex such that one of the pair emits a clockwise flow of the rotational vortex and another of the pair emits a counterclockwise flow of the rotational vortex.

Additionally or alternatively, in this or other embodiments, the nozzle also includes one or more obstacles affixed to an inner surface of the housing.

Additionally or alternatively, in this or other embodiments, a number of the one or more obstacles is half the even number of orifices.

Additionally or alternatively, in this or other embodiments, each of the one or more obstacles creates the rotational vortex of the fire suppression agent into one pair of the two or more orifices.

Additionally or alternatively, in this or other embodiments, each of the one or more obstacles creates the rotational vortex of the fire suppression agent in opposite directions into each orifice of the pair of the two or more orifices.

Additionally or alternatively, in this or other embodiments, the nozzle is disposed in an aircraft.

In another embodiment, a method of assembling a nozzle of a fire suppression system includes obtaining a housing and configuring two or more orifices in the housing to emit a fire suppression agent in a rotational vortex.

Additionally or alternatively, in this or other embodiments, the method also includes suspending a structure within the housing to restrict a path for the fire suppression agent from an inlet of the housing to the two or more orifices, wherein the path is between the structure and an inner surface of the housing.

Additionally or alternatively, in this or other embodiments, the method also includes arranging the structure to restrict the path closer to the two or more orifices more than the path farther from the two or more orifices near the inlet.

Additionally or alternatively, in this or other embodiments, the configuring the two or more orifices includes configuring an even number of orifices.

Additionally or alternatively, in this or other embodiments, the configuring the two or more orifices includes each pair of the two or more orifices emitting a counter-rotational flow of the fire suppression agent in the rotational vortex such that one of the pair emits a clockwise flow of the rotational vortex and another of the pair emits a counterclockwise flow of the rotational vortex.

Additionally or alternatively, in this or other embodiments, the method also includes affixing one or more obstacles to an inner surface of the housing.

Additionally or alternatively, in this or other embodiments, the affixing the one or more obstacles includes a number of the one or more obstacles being half the even number of orifices.

Additionally or alternatively, in this or other embodiments, the affixing the one or more obstacles includes arranging the one or more obstacles to create the rotational vortex of the fire suppression agent into one pair of the two or more orifices.

Additionally or alternatively, in this or other embodiments, the affixing the one or more obstacles includes arranging the one or more obstacles such that each of the one or more obstacles creates the rotational vortex of the fire suppression agent in opposite directions into each orifice of the pair of the two or more orifices.

Additionally or alternatively, in this or other embodiments, the method also includes disposing the nozzle in an aircraft.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

As previously noted, fire suppression is an important function in different environments such as aircraft systems. In prior aircraft fire suppression systems, Halon 1301 is distributed into the cargo bay, for example, via a distribution system. Halon is an ozone-depleting substance whose production has ceased under the Montreal Protocol. Thus, environmentally friendly fire suppression agents are being developed as replacements for Halon. Some of these agents (e.g., trifluoromethyl iodine ($CF_3I$)) have sufficiently high boiling points that prevent large liquid droplets of the agent from fully vaporizing before impacting surfaces. The agent impacting a surface as a liquid droplet can form a film on the surface and hinder sufficient distribution of the agent to suppress the fire.

Figure 1:
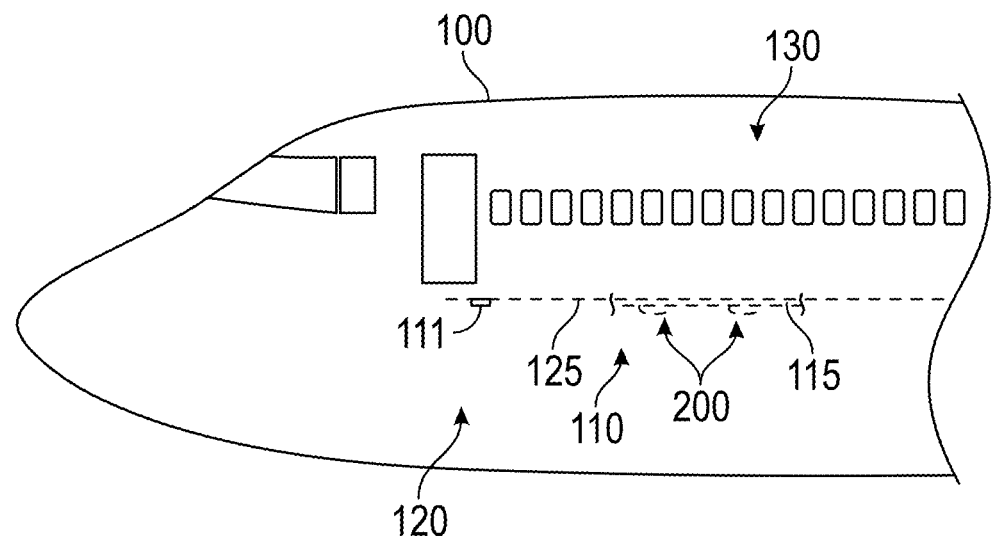
FIG. 1 illustrates aspects of an aircraft that includes a fire suppression system with a nozzle that is designed to create a vortex flow according to one or more embodiments.
Figure 2:
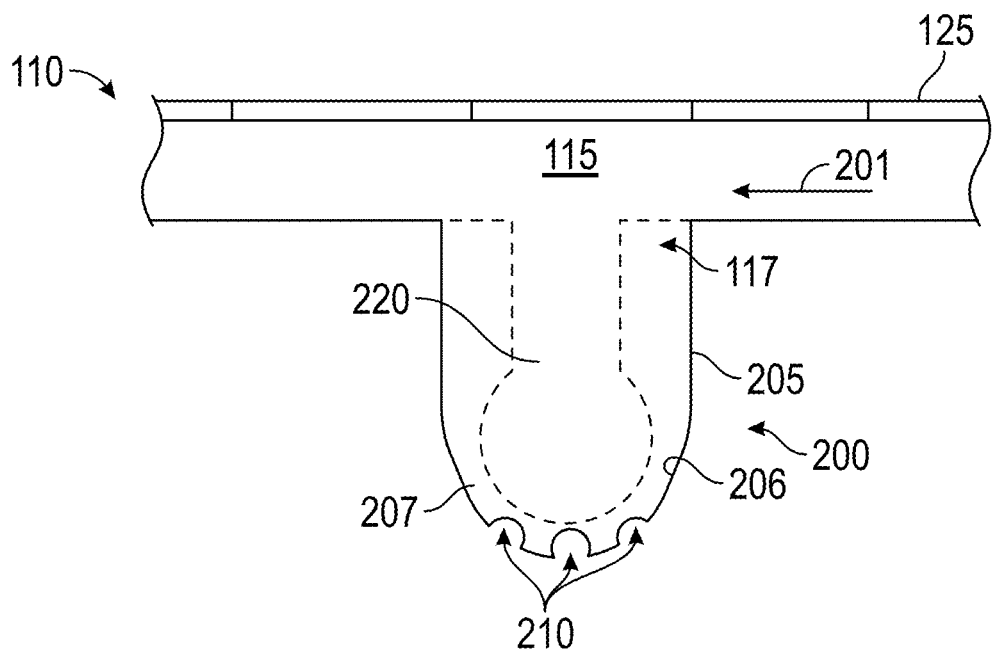
FIG. 2 illustrates aspects of the fire suppression system with a nozzle that is designed to create a vortex flow according to one or more embodiments.
Figure 3A:
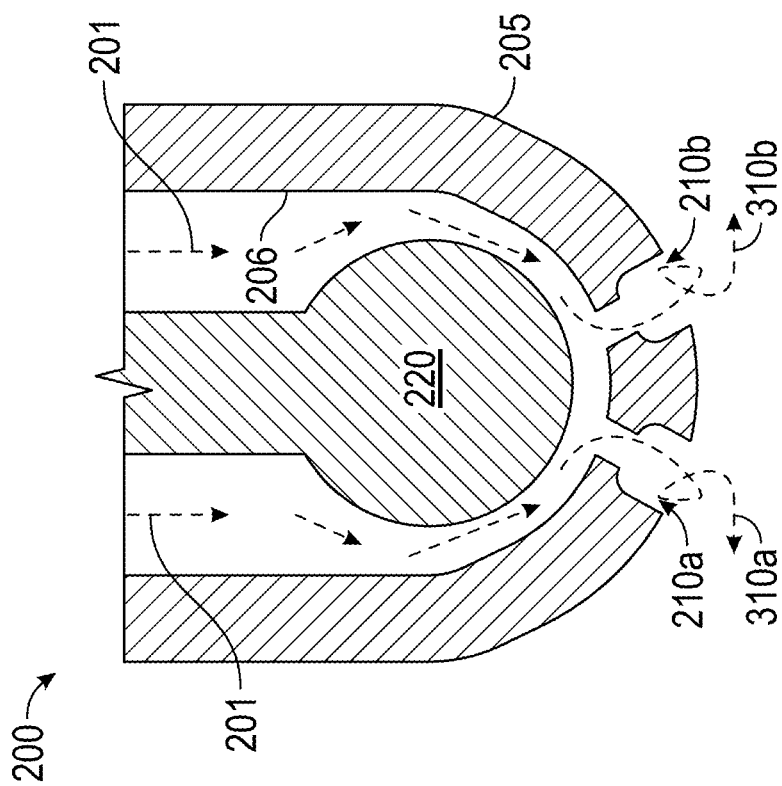
FIG. 3A is a cross-sectional view of a nozzle designed to create a vortex flow according to an exemplary embodiment.
Figure 3B:
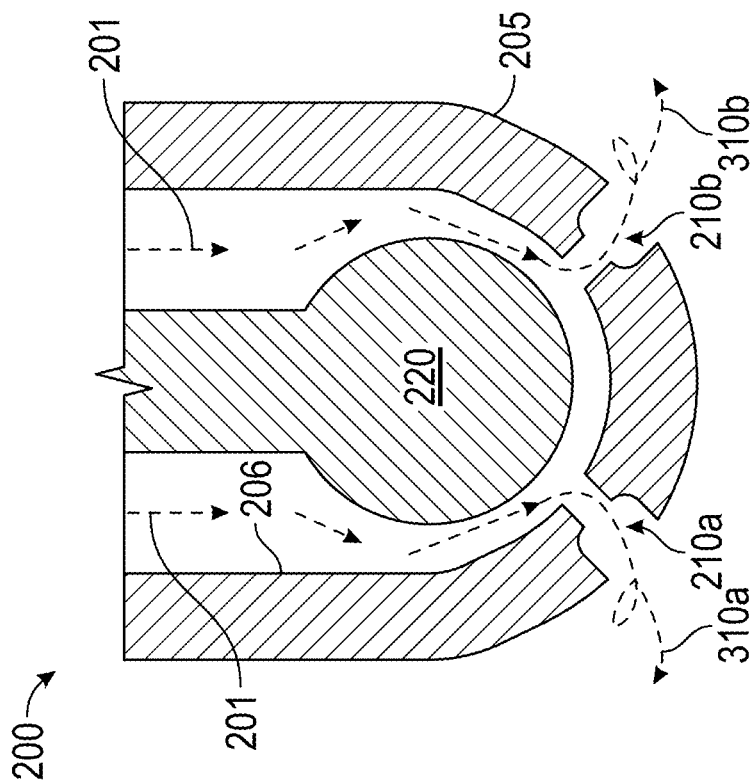
FIG. 3B is a cross-sectional view of a nozzle designed to create a vortex flow according to another exemplary embodiments.
Figure 4:
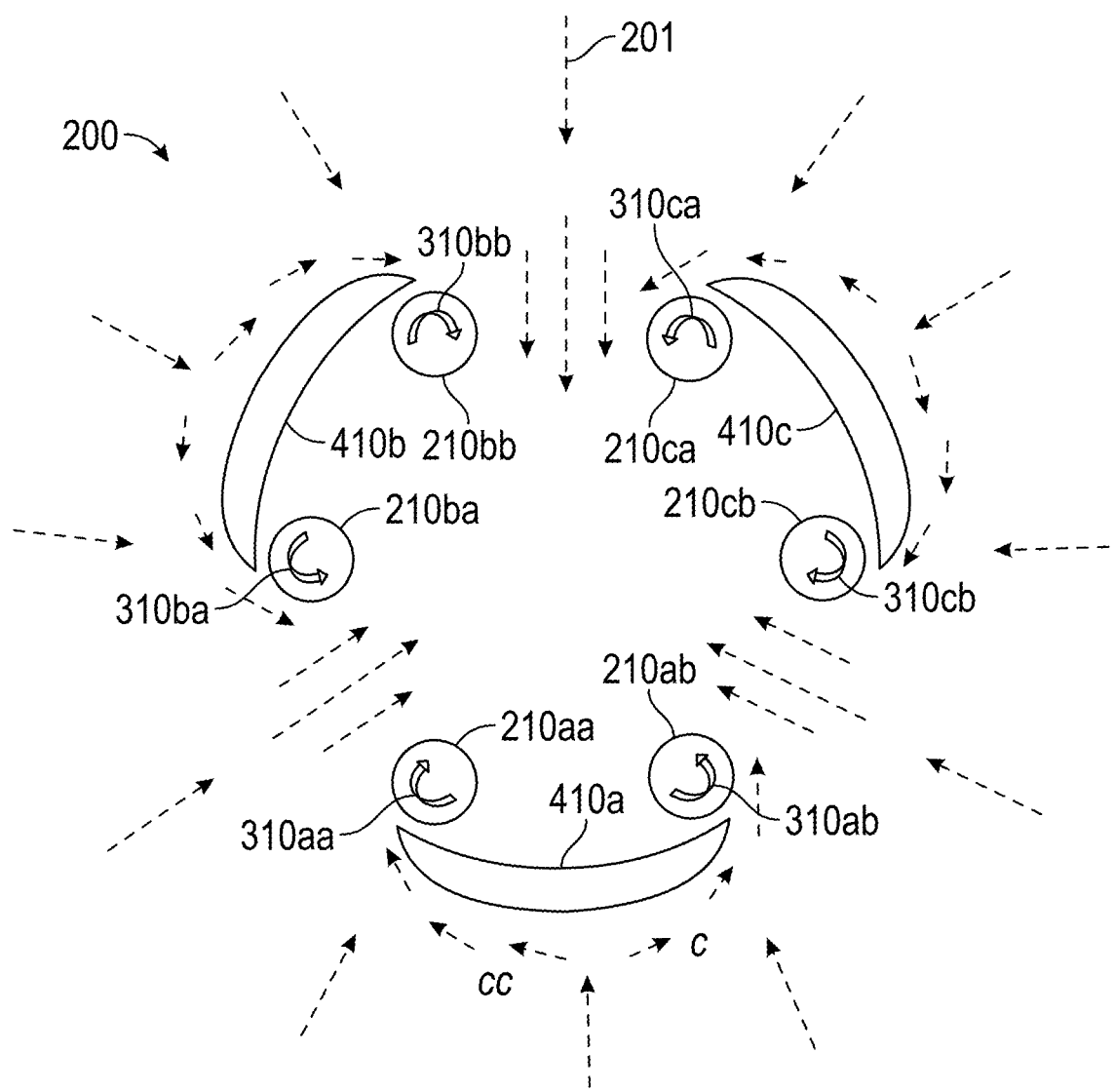
FIG. 4 shows aspects of a nozzle that is designed to create a vortex flow according to one or more embodiments.

To avoid this scenario, prior approaches have sought to arrange a set of nozzles that emit the agent in specific configurations to create a vortex that increases distribution and uniformity of the agent. Embodiments of the systems and methods detailed herein relate to a nozzle geometry to create a rotational vortex. The internal geometry of the nozzle is designed to output a rotational vortex from each orifice of the nozzle. Creating the vortex does not rely on the arrangement of multiple nozzles, as in the prior approach. In addition, the geometry may be designed such that each pair of orifices creates counter-rotating rotational vortexes. The counter rotation of adjacent vortexes establishes a stable flow configuration. If, instead, the adjacent vortex flows were in the same direction, the flow directions of the vortexes would oppose each other a meeting point, resulting in dissipation of the vortexes and less disbursement of the fire suppression agent. As a result of the nozzle design, small liquid droplets of agent are efficiently generated and dispersed into the environment where they vaporize more rapidly than large droplets. The small droplets have dispersion characteristics similar to those of an airborne aerosol.

FIG. 1 illustrates aspects of an aircraft 100 that includes a fire suppression system 110 with a nozzle 200 (FIG. 2) that is designed to create a vortex flow 310 (FIGS. 3A, 3B, 4) according to one or more embodiments. The aircraft 100 is an exemplary environment in which the nozzle 200 according to one or more embodiments may be employed and is used for explanatory purposes. The exemplary aircraft 100 includes a cargo compartment 120 and a passenger compartment 130, separated by a divider 125 that is generally indicated by the dashed line in FIG. 1. An overheat detector 111 and aspects of a fire suppression system 110 are indicated in the cargo compartment 120.

As previously noted, overheat temperature detection and fire suppression may be important functions that are performed in various areas of the aircraft 100 (e.g., cargo compartment 110, engine nacelles). The fire suppression system 110 is shown to include a fire suppression agent supply 115 (e.g., container, pipeline) and nozzles 200 that output the fire suppression agent 201 into the cargo compartment 120 in the exemplary illustration. As discussed further with reference to FIGS. 3A, 3B, and 4, each nozzle 200 produces a vortex flow 310 from each of its orifices 210. An even number of orifices 210 may be used to produce counter-rotating vortex flow 310 from each pair of orifices 210.

FIG. 2 illustrates aspects of the fire suppression system 110 with a nozzle 200 that is designed to create a vortex flow 310 (FIGS. 3A, 3B, 4) according to one or more embodiments. The fire suppression system 110 is shown attached to the divider 125 that acts as a ceiling for the cargo compartment 120 as an exemplary location. A fire suppression agent supply 115 is shown to supply fire suppression agent 201 to a nozzle 200. The nozzle 200 includes an outer housing 205 with orifices 210 that emit the fire suppression agent 201. The inner surface 206 of the housing 205 is indicated. The nozzle 200 may include four orifices 210, for example, with three of them being visible in the view of FIG. 2.

A structure 220 is shown suspended within the nozzle 200. As further discussed, the structure 220 and, optionally, additional obstacles 410 (FIG. 4) aid in creating the vortex flow 310 at each of the orifices 210. The structure 220 restricts the path for the fire suppression agent 201 from an inlet 117 of the nozzle 200 (i.e., of the housing 205) coupled to the fire suppression agent supply 115 to the orifices 210. Specifically, as shown in FIG. 2, the path for the fire suppression agent 201 is limited to the space 207 between the structure 220 and the inner surface 206 of the housing 205. As also shown, this space 207 is more restricted at the portions of the nozzle 200 that are closer to the orifices 210 than at other portions that are farther from the orifices 210 (e.g., at the inlet 117 of the nozzle 200).

FIGS. 3A and 3B are cross-sectional views of a nozzle 200 designed to create a vortex flow 310 according to alternate embodiments. FIG. 3A is a cross-sectional view of a nozzle 200 designed to create a vortex flow 310 according to an exemplary embodiment. The cross-section results from a cut-away of the housing 205 through two orifices 210*a*, 210*b* (generally referred to as 210). A portion of the structure 220 inside the housing 205 is also cut. Flow paths of the fire suppression agent 201 are indicated. As illustrated, the structure 220 in the nozzle 200 restricts the path of the fire suppression agent 201 to each of the orifices 210*a*, 210*b*.

As a result of the fire suppression agent 201 colliding with the inner surface 206 of the housing 205 and the structure 220, the flow rate of the fire suppression agent 201 reaching the orifices 210 is increased. The speed and angle at which the fire suppression agent 201 enters each orifice 210 results in vortex flow 310 of the fire suppression agent 250 out of each orifice 210. As FIG. 3A indicates, the vortex flow 310*a* out of the orifice 210*a* rotates clockwise while the vortex flow 310*b* out of the orifice 210*b* rotates counterclockwise. Thus, the pair of orifices 210*a*, 210*b* creates counter-rotating vortex flow 310.

FIG. 3B is a cross-sectional view of a nozzle 200 designed to create a vortex flow 310 according to another exemplary embodiment. The cross-section shown in FIG. 3B is similar to that shown in FIG. 3A. The counter-rotating vortex flow 310*a*, 310*b* of the fire suppression agent 201 resulting from each nozzle 210*a*, 210*b* is shown. However, the nozzle 200 in FIG. 3B has a narrow spray angle compared with the spray angle of the nozzle 200 in FIG. 3A. That is, the orifices 210*a* and 210*b* are closer and are angled (angled down more than the orifices 210*a*, 210*b* in FIG. 3A according to the orientation shown in FIGS. 3A and 3B) such that the vortex flows 310*a* and 310*b*, respectively emitted by orifices 210*a* and 210*b* and rotating in opposite directions to each other, are closer to each other in FIG. 3B than in FIG. 3A.

The examples shown in FIGS. 3A and 3B are not intended to limit the number or arrangement of the orifices 210 or their angle. Any number of orifices 210 may be used. As previously noted, an even number of orifices 210 may be used with each pair of orifices 210 emitting counter-rotating vortex flow 310. The number of orifices 210 may be selected based on several factors. For example, the angle from inside (at the inner surface 206 of the housing 205) to outside (at an outer opening of the housing 205) may differ. The resulting spray angle may be a basis for determining the number of orifices 210. For example, a nozzle 200 with a narrower spray angle may require more orifices 210 than a nozzle 200 with a wider spray angle in order to distribute the fire suppression agent 201 in a given space. Additionally or alternately, more nozzles 200 may be used.

FIG. 4 shows aspects of a nozzle 200 that is designed to create a vortex flow 310 according to one or more embodiments. Based on the orientation illustrated in FIG. 2, the view in FIG. 4 is within the housing 205 of the nozzle 200 looking below the structure 220. Three pairs of orifices 210aa and 210ab, 210ba and 210bb, and 210ca and 210cb (generally referred to as 210) are shown. Three obstacles 410a, 410b, and 410c (generally referred to as 410) are also shown. These obstacles 410 are affixed to the inner surface 206 of the housing 205 of the nozzle 200. As shown, each obstacle 410 corresponds to one pair of the orifices 210. In the view shown in FIG. 4, the structure 220 may be above the orifices 210 and obstacles 410, further narrowing the flow path for the fire suppression agent 201 and further generating the vortex flow 310. That is, the flow of fire suppression agent 201 on the outer perimeter of the view shown in FIG. 4 has flowed past the structure 220.

The direction of the vortex flow 310 created based on the obstacles 410 and output through each orifice 210 is indicated. For example, the obstacle 410a is positioned to split the flow of fire suppression agent 201 and has a curved shape to generate a clockwise component c that creates a clockwise vortex flow 310aa into and through orifice 210aa and also into a counterclockwise component cc that creates a counterclockwise vortex flow 310ab into and through orifice 210ab. The size and shape of the obstacles 410 may be based on the distance between a given pair of orifices 210 and their relative location. The shape is designed to create the counter-rotational flow into the pair of orifices 210.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A nozzle of a fire suppression system, the nozzle comprising:
    a housing; and
    two or more orifices in the housing, wherein a number of orifices in the two or more orifices is an even number, and the two or more orifices are configured to emit a fire suppression agent, wherein each of the two or more orifices emits the fire suppression agent in a rotational vortex; and
    one or more obstacles affixed to an inner surface of the housing wherein a number of the one or more obstacles is half the even number of orifices.

2. The nozzle according to claim 1, further comprising a structure suspended within the housing and configured to restrict a path for the fire suppression agent from an inlet of the housing to the two or more orifices, wherein the path is between the structure and an inner surface of the housing.

3. The nozzle according to claim 2, wherein the structure is configured to restrict the path closer to the two or more orifices more than the path farther from the two or more orifices at the inlet.

4. The nozzle according to claim 1, wherein each pair of the two or more orifices emits a counter-rotational flow of the fire suppression agent in the rotational vortex such that one of the pair emits a clockwise flow of the rotational vortex and another of the pair emits a counterclockwise flow of the rotational vortex.

5. The nozzle according to claim 1, wherein each of the one or more obstacles is configured to create the rotational vortex of the fire suppression agent into one pair of the two or more orifices.

6. The nozzle according to claim 5, wherein each of the one or more obstacles is configured to create the rotational vortex of the fire suppression agent in opposite directions into each orifice of the pair of the two or more orifices.

7. The nozzle according to claim 1, wherein the nozzle is configured to be disposed in an aircraft.

\* \* \* \* \*